United States Patent [19]

Omori et al.

[11] Patent Number: 4,564,490

[45] Date of Patent: Jan. 14, 1986

[54] METHOD OF PREPARING SINTERED SHAPES OF SILICON CARBIDE

[75] Inventors: Mamoru Omori, 2-18-1, Kano, Sendai-shi, Miyagi-ken; Humihiko Takei, Sendai, both of Japan

[73] Assignee: Mamoru Omori, Miyagi, Japan

[21] Appl. No.: 616,787

[22] Filed: Jun. 1, 1984

Related U.S. Application Data

[63] Continuation-in-part of Ser. No. 361,299, Mar. 24, 1982, abandoned.

[30] Foreign Application Priority Data

Mar. 27, 1981 [JP] Japan ................................. 56-44109

[51] Int. Cl.⁴ ............................................. C04B 35/56
[52] U.S. Cl. ...................................... 264/65; 264/63; 264/332; 501/88; 501/89

[58] Field of Search ...................... 501/88, 89; 264/63, 264/65, 332

[56] References Cited

U.S. PATENT DOCUMENTS

| | | | |
|---|---|---|---|
| 3,998,646 | 12/1976 | Weaver | 501/89 |
| 4,080,415 | 3/1978 | Coppola et al. | 501/88 |
| 4,097,293 | 6/1978 | Komeya et al. | 501/87 |
| 4,354,991 | 10/1982 | Suzuki et al. | 501/89 |
| 4,372,902 | 2/1983 | Denton et al. | 501/88 |

*Primary Examiner*—Mark L. Bell

[57] ABSTRACT

A series of sintered shapes of silicon carbide of high strength comprising 0.027 to 11.300 atomic percent of one or more members of rare earth oxides and the balance of silicon carbide are disclosed. Method of making such silicon carbide shapes is also disclosed.

2 Claims, No Drawings

METHOD OF PREPARING SINTERED SHAPES OF SILICON CARBIDE

This is a continuation-in-part of co-pending application Ser. No. 361,299 filed Mar. 24, 1982, now abandoned.

BACKGROUND OF THE INVENTION

1. Field of the Invention

The present invention relates to sintered shapes of silicon carbide and manufacture of the same, more particularly relates to sintered shapes of silicon carbide including oxides of rare earth elements and manufacture of the same.

2. Discussion of the Prior Art

Silicon carbide has been widely used of its excellent hot strength, thermal shock resistance, acid resistance, abrasion resistance and a high creep limit as high temperature resistant shapes and high temperature heating element, and recently its applications have been rapidly enlarged in the fields of high temperature structural material and anti-abrasive material.

However, due to the sintering difficulty of silicon carbide (hereinafter referred to as SiC), it is generally difficult to obtain dense and sintered shapes of high strength. Therefore, there have been used to manufacture such sintered shapes the hot pressing procedure with admixture of $Al_2O_3$, iron oxides, AlN, BeO, Be, B, $B_4C$, BN, Al, $AlPO_4$ as sintering assist, and the reaction sintering procedure wherein a mixture of SiC and C powder is reacted with molten or gaseous silicon. These procedures can not provide complicated configuration of the shapes and are not suitable to mass production. The presently most suitable process for manufacture of sintered SiC shapes is the non-pressure sintering procedure which involves mixing SiC powder with C and B as sintering assists and shaping into a green compact and sintering under free of pressure, as disclosed in the U.S. application Ser. No. 409,073. In the sintered shape of SiC produced by the above procedure, boron carbide resulting from the reaction of B and C promotes the sintering of SiC powder. It has been discovered that oxide sintering assists used in the hot pressing procedure has no effect on the sintering promotion in the non-pressure sintering procedure, and generally such oxides are deemed to be noxious in the non-pressure sintering of silicon carbide.

SUMMARY OF THE INVENTION

The present invention provides novel process for manufacturing sintered SiC shapes using a novel group of sintering assists different from that have been used in pressure and non-pressure sintering processes, and combined use of such group members with known sintering assists.

DESCRIPTION OF THE PREFERRED EMBODIMENTS

According to the present invention, alpha-SiC, beta-SiC or amorphous SiC may be used, and it has been discovered that when 0.1-10% by weight of alpha-SiC is mixed with beta-SiC or amorphous SiC in the raw material uneven growth of SiC grain may be controlled thus enhancing hot strength and creep limit.

As raw material of SiC, any compound having SiC bond, e.g. organic silicon compounds or organic high molecular silicon compounds may be used per se or mixed with SiC powder.

In according to the present invention, the following groups (a) and (b) of sintering assists may be used:

(a) sintering assists comprising a solution of at least one member selected from the group of rare earth compounds;

(b) sintering assists comprising a solution of at least one member selected from a group of rare earth compounds and another solution of at least one member selected from a group consisting of aluminum compounds and boron compounds;

As above-mentioned rare earth compounds, aluminum compounds and boron compounds, their acid adduct of hydroxides, phosphates, carbonates, basic carbonates, nitrates, sulfates, organic acid salts, halides, organic metal compounds, coordination compounds and alcoholates soluble in a solvent may be used.

Of the above chemical species of these sintering assists, acid adducts of hydroxides are synthesized by a reaction between a hydroxide and an acid. When a lesser equivalent of the acid than that of a metal element in the hydroxide is reacted with the hydroxide, an acid adduct is formed by partial reaction of the metal element in the hydroxide, said adduct being water-soluble. Acids which may be used for the reaction includes hydrochloric, sulfuric, nitric, fluoric, phosphoric, perchloric, carbonic acids, and organic (such as formic, acetic, propionic, tartaric, fumaric, lactic, oxalic, stearic, maleic, benzoic, malic, malonic, citric, butyric) acids and others.

In accordance with the present invention, the preparation of mixed material of silicon carbide powders and sintering assists for the shapes are conveniently performed by the following methods. In the method which may be used for the chemical species of the sintering assists (e.g. acid adducts of hydroxide, nitrates, sulfates, organic acid salts, basic carbonates, carbonates, phosphates, perchlorates, halides, organic metal compounds and alcoholates) soluble in solvents, the sintering assists are dissolved in solvents such as water, alcohols, ethers, ketones, hydrocarbons, DMSO, or DMF, mixed with silicon carbide powder for a sufficient time for thorough mixing. In this mixing operation, the surface of the silicon carbide powder is coated with a thin film of the assist, therefore a small amount of the assist will provide a sufficient sintering effect. The examples of the chemical species of solvent soluble sintering assists and solvents are as follows: acid adducts of hydroxide is water-soluble. Some of alcoholates are soluble in ethers and aromatic hydrocarbons. Some of complexes are soluble in water, alcohols, ethers, hydrocarbons. Organic metal compounds are soluble in hydrocarbons and organic solvents such as ethers. Some of nitrates, phosphates, organic acid salts and halides are soluble in water.

For the above-mentioned mixing operation, conventional mixers or kneading machines may be employed.

The mixing atmosphere may be an oxidizing gas such as air, carbon dioxide, and or oxygen; non-oxidizing gas such as nitrogen, argon, helium, hydrogen, neon, carbon monoxide and/or hydrocarbon; Usually the mixing is performed in the air. Under the mixing under the air, organic metal compounds, alcoholates and a portion of complexes are formed into oxides, hydroxides and carbonates under the reaction of oxygen, carbon dioxide and water. These compounds in ultrafine powder adhere to the surface of silicon carbide powder promoting the sintering effect.

The mixed material thus obtained is then formed into a desired shape. Any conventional shaping techniques in the ceramic industry and powder metallurgy may be used for the shaping operation.

When sintering assists are mixed with the silicon carbide powder, a small amount of lubricant such as 1% by weight of stearic acid or salts thereof may be added before pressing in a metal mold.

The pressing may be performed with single-acting, double-acting, and/or hydrostatic press. Shapes of simple configuration may be processed by the subsequent treatment, but shapes of rather complex configuration are required to be processed through grinding or milling operation. When a certain strength for re-forming is required, the shapes may be prefired in a temperature range of 300°–1600° C. under an oxydizing, non-oxidizing atmosphere or an vacuum. The mixed material may also be conducted by slip-casting. In the slip-casting, a solvent is used during the mixing operation and an additional amount of such solvent will produce the slip-casting material. These casting material may be mold-shaped through conventional slip-casting techniques. The silicon carbide mixed material in a form of paste may be conducted by the injection molding operation. In the formation of the paste, a binder in addition to the solvent is conveniently used. For such binder, polyvinyl alcohol, polyethylene glycol or wax is preferred because they do not produce any residue after evaporation. When sintering assists are in a viscous solution, i.e. acid adducts of hydroxide are used as sintering assists, there may be obtained preferred pastes without binder. In this case the acid adducts of the hydroxides impart viscosity to the paste and act as sintering assists during the firing.

In accordance with the present invention, the SiC shapes are then fired. The firing furnace may be of any conventional type, but a type that may be changed of its atmosphere as oxidizing, non-oxidizing or vacuum is preferred. The firing temperature is in a range of 1600°–2300° C. Under 1600° C., there is caused no sintering reaction, while a temperature above 2300° C., is inadequate because of remarkable decomposition of SiC.

The sintering operation is completed in the above range, and at a larger amount of sintering assists the operation is completed at a relatively lower temperature. Two stage firing operation at low and high temperature is advantageous when shapes are of relatively large size, or sintering assists generate gases during the firing. Non-oxidizing atmosphere or an vacuum is desirable for a high temperature sintering. As non-oxidizing atmosphere, nitrogen, argon, helium, neon, hydrogen or carbon monoxide gas of low oxygen content is used. Alternatively, surroundings of SiC or C may be used. High pressure of the atmosphere is desirable, but it is economically disadvantageous, and a lower pressure than 1 atmospheric pressure will result in a satisfactory result. On the other hand, in a low temperature sintering, non-oxidizing atmosphere or vacuum is not required. Firing at an temperature below 1300° C. which does not cause a remarkable oxidation of silicon carbide, an oxidizing atmosphere as the air may be used. In this case, sintering assist oxidize into oxides during the firing operation which promote the function of sintering assists.

The temperature increasing speed up to the desired sintering temperature depend upon the configuration of the shapes, and lower speed is preferred to a large configuration. Since the firing up to 1600° C. does not develop a remarkable sintering, the temperature may be increased rapidly, e.g. for one hour. However, since the sintering assist compounds which may be decomposed by heating are used, the temperature increase of a low speed as three hours up to 1600° C. is desirable because a reaction during the low temperature firing will generate gases of a small quantity, if any. Since the shapes shrink at a temperature higher than 1600° C., an increasing speed as low as 7° C./min. to the expected firing temperature is preferred.

Because of the covalent bonding property of SiC, this material cannot be sintered without a sintering assist. In the prior general manufacture of SiC shapes, SiC powder is mixed with a sintering assist powder, and the mixture is compacted and sintered. In this case, successive reaction processes into a dense shape are analyzed as follows: in the first stages, the sintering assist diffuses into the surface of SiC powder, and in the second stage, the assist reacts with the surface lowering the surface energy and in the third stage sintering reaction occurs among SiC powders. The diffusion speed of the assist prior to the sintering reaction depends on the ambient temperature, but generally requires a relatively long time to cover the whole surface with the assist. However, such a long time for sustaining a high temperature in manufacturing the shape may cause deterioration of important properties such as mechanical strength due to uneven growth of crystal grain, and hence such sintering process for a long time should be avoided.

Therefore, pressureless sintering using SiC powders having uneven diffused assist may result in an unsatisfactorily dense shape or large-size shape subject to cracking caused during the sintering process.

When a sintering assist in the form of powder providing a slow diffusion speed is used, the pressure sintering process has been generally employed. However, this process is disadvantageous in the manufacturing cost and difficulty in forming a shape of complex configuration.

According to the present invention, since uniform coating of SiC powder with a sintering assist may be easily obtained, the sintering process may be performed eliminating the diffusion stage.

Meanwhile, since oxides usually used as a sintering assist cannot form a solution, compounds soluble in a solvent are used to form a solution which are mixed with SiC powder to cover the surface thereof. These compounds change into oxide during the sintering and cover the whole surface of the SiC powder without the diffusion process. Therefore, a dense shape may be obtained without pressure application for a relatively short period of time.

Therefore, in accordance with the present invention, due to the uniform coating of an assist on SiC powder surface, a large-size shape may be easily sintered almost without causing cracking. Accordingly, the present invention provides an economically advantageous process for reducing the number of unapproved products to a large extent in comparison with the prior processes.

Furthermore, the above-mentioned uniform coating reduces the amount of a sintering assist to be added, and suitably controls the deterioration of the hot strength of the shape due to an excessive addition of the assist.

In the general process for manufacturing SiC sintered shapes, an organic polymer is sometimes used as a shaping agent to impart the bonding and plastic properties of green shapes, which must be removed before the sintering process.

Of the above-mentioned compounds used for the present invention soluble in a solvent, most acid adducts of hydroxide exhibit a viscous property when dissolved in water. In the present invention, acid adducts having similar properties to the usual organic polymers are used, eliminating such polymers.

In the sintered shapes made from the raw material including only rare earth compounds, a part of the rare earth compounds (primarily oxides) diffuses into silicon carbide, and a part of silicon carbide diffuses into rare earth compounds (primarily oxide), promoting the sintering silicon carbide. On the other hand, when rare earth element and carbon or their compounds are used as sintering assists, carbon or its compound react with co-existing rare earth compounds and further with $SiO_2$ in the surface of silicon carbide during the firing operation, and a considerable portion of the assists is evolved out of the system as a gas and a part of the remaining portion diffuses into silicon carbide. Consequently, the surface of silicon carbide is activated, simultaneously the mutual diffusion between rear earth compounds (primarily oxides) and silicon carbide is facilitated by carbon diffused in silicon carbide, enhancing the speed of sintering reaction. When this effect is compared with the time of sintering completion, the sintering time of the shapes added with carbon and rare earth compounds together is about one-half to one-fourth of that of the shapes added with only rare earth compounds.

In the shapes produced with sintering assists comprising rare earth compounds plus one or more members selected from a group consisting of aluminum and boron compounds, the rare earth elements or their compounds react with aluminum and boron compounds into new compounds or solid solutions. In these compounds and solid solutions there naturally is existing compounds and solid solutions of $SiO_2$. Since these aluminum and boron in the compounds and solid solutions easily diffuse into silicon carbide, the diffusion speed of silicon carbide into rare earth elements (primarily oxides) is increased, consequently the sintering speed is faster than with only an addition of rare earth compounds. In comparison of these speeds by sintering time under the same temperature condition, the time for shapes including rare earth elements plus aluminum or boron is one-third to one-fifth of that only including rare earth compounds. In the shapes with sintering assists including rare earth elements, aluminum, boron, or carbon compounds these carbon, aluminum or boron exhibit same effect as rare earth elements added with carbon, aluminum, or boron and give a synergistic effect, shortening the sintering time.

Due to the sintering effect of above-mentioned aluminum, boron or carbon compounds are not necessarily to be added initially to the rare earth compounds. In other words, it is possible that one or more members selected from a group consisting of rare earth compounds are added to silicon carbide powder, and the mixture are compacted into shapes, then sintered at a high temperature under a partial pressure of at least one member selected from a group consisting of aluminum, boron, carbon and their compounds to obtain dense sintered products.

In the sintering operation, green shapes are placed in a closed or semi-closed furnace with aluminum, boron, carbon or their compounds and sintered at a high temperature. The atmosphere in the operation is preferably non-oxidizing atmosphere or an atmosphere including a small amount of oxidizing gas. When metal aluminum is used as the sintering assist, this metal reaches a vapor pressure of 1 mmHg at a relatively low temperature, e.g. 1284° C. The evaporated aluminum reacts with oxygen gas adsorped in a crucible or sample, or a small amount of oxygen gas included in the non-oxidizing gas, to form partly or wholly aluminum oxide. Aluminum oxide and the remaining aluminum metal vapor penetrate into and react with the shapes, and a part of its sublimate, thereby predominantly sintering rare earth elements or their compounds. When aluminum compounds including oxygen are used as a sintering assist, an oxide is formed by heating thus exhibiting same effect as in the above-mentioned case. Aluminum compounds not including oxygen, e.g. halide or organic metal compound, are similarly oxidized in part to exhibit same effect. The partial pressure of aluminum or its compounds is sufficiently increased during sintering operation to complete the sintering of silicon carbide.

Sintering of green shapes in a furnace with boron or boron compounds may be performed similarly to the above-mentioned aluminum or aluminum compounds.

When green shapes are sintered in a furnace with carbon or carbon compounds, oxygen existing in the sintering atmosphere react with carbon and escape out of the system. It is known that when a closed graphite vessel is heated to a high temperature the carbon atmosphere is formed in the vessel. Therefore, sintering of green shapes in the atmosphere may eleminate a specific formation of carbon atmosphere. Also, since hydrocarbon compounds generally evaporate at a low temperature, heating of the hydrocarbon gas will easily produce the carbon atmosphere.

Carbon and carbon compounds to be mixed in the green shapes include acetylene black, carbon black, graphite powder, coal powder, active carbon, high molecular aromatic compounds (e.g. tar or pitch), and other organic compounds remaining carbon after firing (e.g. phenol resin, aniline formaldehyde resin, cresol formaldehyde resin and furan resin).

It is already known that carbon or carbon-containing compounds mixed into green shapes react with $SiO_2$ existing on the surface of SiC powder during firing to form SiC, and $B_4C$ produced by the existence of boron helps sintering operation. Inventors believe that when carbon and boron are coexisting as sintering assists even under the existence of rare earth oxides of the present invention, the sintering effect of the above-mentioned $B_4C$ is partly recognized to promote the sintering operation.

It is desirable that upon completion of sintering operation, the added carbon is almost reacted to minimize free carbon as possible in the sintered products, because a large quantity of free carbon deteriorate acid resistance at a high temperature of the products.

In practive of the present invention, the sintering operation may be performed under non-pressure or pressure condition, especially shapes of high density and strength may be formed under non-pressure condition. In the prior art shapes, $Al_2O_3$, $Fe_2O_3$, BeO or $B_4C$ added to SiC powder as sintering assists sometimes remain in SiC grain boundary which lower strength than the theoretical strength of the shapes, and larger the added amount of the assists tends to lower the hot strength. Accordingly, a smaller amount of added assists is desirable for sintered products of high strength, but lesser amount will deteriorate sintering property under non-pressure condition.

According to the present invention, rare earth compounds in the assists mixed with SiC powder primarily deposit in the grain boundary. Due to the high melting points of these rare earth compounds in grain boundaries in the shapes, a high strength at a high temperature (1500° C.) is maintained. In one embodiment of the present invention, sintering assists in solution is mixed with silicon carbide powder in an effective condition, thus small amount of sintering assists may promote the sintering operation. In other words, deposits in the grain boundaries may be minimized to prevent the deterioration of strength of the shapes.

In another embodiment of the present invention, green shapes are sintered under surroundings or atmosphere of aluminum, boron, carbon or their compounds, in which minimum amount of the assists (aluminum, boron, or carbon) facilitates the formation of shapes of high strength. However, there is minimum limit of the assists in the non-pressure operation, and it would be difficult to restrict the amount of the assists of 2% by weight on oxide basis.

When a lesser amount of the assists is used, a pressure sintering operation is advantageous to promote the self-sintering property, in which case even a smaller amount of the assists less than 2% by weight produces dense silicon carbide shapes of high hot strength. Pressure sintering operation may be performed normally with a hot press, a hot hydrostatic press or a furnace with a variety of atmospheres.

Reasons for restricting the compositions in the present invention will be described below.

In the method of the present invention, the amount of rare earth compound in a sintering assist to be added to SiC powder, in case of (a) in the appended claims, should be restricted in a range of 0.027–11.300 atomic % based on rare earth oxides, total sum of SiC and sintering assist being 100 atomic %. The amount of rare earth compound outside of the above-mentioned range cannot afford shapes having desired strength.

In case of (b) in the appended claims, the amount of compounds of rare earth elements, aluminum and horon, based on the respective oxides, total sum of SiC and the sintering assist being 100 atomic %, should be restricted in a range of 0.021–11.300 atomic % for rare earth, compounds, and should be restricted in a range of 0.006–12.000 atomic % for aluminum and boron compounds. The amount of these compounds outside of the above-mentioned two ranges cannot afford shapes having desired strength.

Sintered silicon carbide shapes of the present invention may be prepared from compositions described in the appended claims. SiC raw material for use in the preparation of sintered shapes in accordance with the present invention is naturally contains small amounts of impurities such as $SiO_2$, Fe, Co, Al, Ca, free carbon and other elements. Therefore, the shapes prepared from this kind of material are intended to be included in the scope of the present invention.

The present invention will be described in the following examples.

EXAMPLE 1

9.0 g of yttrium oxide is dissolved in 180 ml of 2N-hydrochloric acid and then 40 ml of ammonia water is added to precipitate hydroxide. Yttrium hydroxide is obtained by filtration. Yttrium hydroxide is placed in 260 ml of formic solution (pH 2) and agitated for three hours at the room temperature to cause a reaction between the hydroxide and formic acid. The reacted solution is condensed under vacuum and dried in vacuum to obtain 18.5 g of an acid adduct of yttrium hydroxide. On the other hand, 30 g of aluminum isopropoxide is dissolved in 140 ml of benzene, and added 200 ml of 1N-hydrochloric acid solution. Formed aluminum hydroxide immediately reacted with hydrochloric acid, and the reaction is completed within several hours. An aqeous solution in the reaction solution is condensed under vacuum, and dried in vacuum to obtain 20 g of an acid adduct of aluminum hydroxide. 1.5 g of acid adduct of yttrium hydroxide and 1.5 of acid adduct of aluminum hydroxide are dissolved in water, then 27 g of beta-SiC (containing 5% of alpha-SiC) having the particle size of 0.27 μm is added to the solution and dried to remove water. The dried powder is placed in a metal mold of 8×36 mm and compacted with a double-acting press to obtain a green shape. The green shape is fired to 500° C. at a rate of 100°/hour in the air, then fired up to 1400° C. at a rate of 200°/hour under nitrogen atmosphere. The fired shape is placed in a graphite crucible with surrounding of alpha-SiC powder having the particle size of 100 μm, and heated to 1950° C. in a high frequency furnace at a rate of 200° C./hour, held at this temperature for 30 minutes to obtain a sintered shape. The specific gravity of the shape is 3.17 which shows the bending strength of 85 kg/sq.mm at the room temperature. It is also found that the shape has excellent hot strength, acid resistance, thermal shock resistance and creep limit.

EXAMPLE 2

3 g of aluminum sulfate is dissolved in water and 88 g of alpha-SiC having an average particle size of 1 μm is added, and the mixture is blended in a mixer and dried. On the other hand, 9 g of lanthanum triacetyl acetonate is dissolved in benzene, to which solution the above-mentioned dried powder is mixed. After thorough mixing, benzene is evaporated and there is obtained mixed powder after leaving for five day in the air. The mixed powder is place in a metal mold of 8×36 mm and compacted with a double-acting press to form a green shape. The shape is fired up to 600° C. in the air at a rate of 100° C./hour, then up to 1400° C. under nitrogen atmosphere at a rate of 200° C./hour, further fired in a graphite crucible with a high frequency furnace up to 2100° C. at a rate of 200° C./hour and held at the temperature of 2100° C. to form a sintered shape. The specific gravity of the shape is 3.11 which shows bending strength of 63 kg/sq. mm at the room temperature.

EXAMPLE 3

22 g of cerium isopropoxide and 25 g of aluminum isopropoxide are dissolved in benzene. 300 g of beta-SiC (containing 5% of alpha-SiC) having an average particle size of 0.27 μm is added to the benzen solution and mixed thoroughly in a small kneader, then dried to remove benzene. The dried powder is left as it is in the air for seven days, and then place in a metal mold having an internal diameter of 20 mm, and compacted with a single-acting press. Then the shape is placed in a rubber tube, and compacted in a hydrostatic press using water as pressure medium to form a green shape. The green shape is fired in the air up to 500° C. at a rate of 100° C./hour, in argon atmosphere up to 1400° C. at a rate of 200° C./hour, then fired in Tammann furnace up to 2100° C. in argon atmosphere at a rate of 200° C./hour. Linear shrinkage during the firing was 16% based on the fired shape at 500° C. The specific gravity of the shape is 3.15 and the bending strength at the room temperature is 75 kg/sq. mm.

EXAMPLE 4

4 g of praseodymium sulfate and 3 g of yttrium nitrate are dissolved in water. 93 g of beta-SiC (including 5% of alpha-SiC) having the average particle size of 0.27 μm is added to the solution which is dried to remove water. The dried powder is placed in a metal mold of 8×36 mm and compacted with a double-acting press to obtain a green shape of 3 mm thickness. The green shape is fired in the air up to a temperature of 600° C. at a rate of 100° C./hour, then up to 1400° C. in nitrogen atmosphere at a rate of 200° C. The fired shape is placed in a graphite crucible and surrounded with alpha-SiC having the particle size of 100 μm around which aluminum oxalate powder is filled. The covered crucible is fired in a high frequency furnace. The temperature increasing rates are 200° C./hour for a range of 1400°–1700° C., and 75° C./hour for a range of 1700°–2000° C. Further firing for two hours at 2000° C. produces a sintered silicon carbide shape. The specific gravity of the shape is 3.08 and the bending strength at the room temperature is 63 kg/sq. mm.

EXAMPLE 5

3 g of the acid adduct of yttrium hydroxide obtained in Example 1 is dissolved in water, added with 27 g of alpha-Sic having the particle size of 1 μm and after mixing and drying there is obtained dried powder. The powder is place in a metal mold and compacted into a green shape of 30 mm of diameter and 5 mm of thickness. The green shape is fired up to 500° C. in the air at a rate of 100° C./hour. The fired shape is coated with alpha-SiC powder having the particle size of 1 μm with an addition of 3% of polyvinyl alcohol, placed in a graphite crucible with surroundings of aluminum oxide powder. The covered crucible is heated in a high frequency furnace up to 1700° C. at a rate of 200° C./hour, then up to 2050° C. at a rate of 50° C./hour. Holding at this temperature 2050° C. for two hours produce a sintered silicon carbide shape. The specific gravity of the shape is 3.11 and the bending strength is 58 kg/sq. mm at the room temperature.

EXAMPLE 6

9 g of cerium nitrate is dissolved in water, and 1 g of carbon black and alpha-SiC having the average particle size of 1 μm is added. The mixture is blended in a mixer for three hours. The mixture is dried, and the dried powder is placed in a metal mold of 8×36 mm and compacted with a double-acting press to form a green shape. The shape is fired up to 1400° C. at a rate of 200° C./hour in nitrogen atmosphere. The shape after reforming is placed in a graphite crucible with surroundings of alpha-SiC having the particle size of 100 μm. The covered crucible is fired up to 2100° C. at a rate of 200° C./hour,and held at this temperature to for 30 minutes obtain a silicon carbide shape. The shape has the specific gravity of 3.07, the bending strength at room temperature of 61 kg/sq. mm, and the bending strength at 1300° C. of 44 kg/sq. mm.

EXAMPLE 7

6 g of lutetium acetyl acetonate is dissolved in benzene, and 3 g of boron oxide, 2 g of carbon black and 89 g of alpha-SiC (of average particle size of 1 μm) are added. The mixture is blended in a mixer and dried by evaporation of benzene. The dried powder is placed in a metal mold of 8×36 mm, and compacted with a double-acting press of form a green shape. The shape is fired in Siliconit furnace up to 1400° C. at a rate of 200° C./hour under nitrogen atmosphere. The shape is then fired up to 2000° C. at a rate of 200° C./hour is Tammann furnace under argon atmosphere to form a sintered silicon carbide shape. The shape has the specific gravity of 3.08, the bending strength at the room temperature of 61 kg/sq. mm, and the specific resistance of $1.5 \times 10$ ohm-cm.

EXAMPLE 8

6 g of aluminum chloride and 4 g of yttrium chloride are dissolved in water, and 2 g of carbon black, 48 g of beta-SiC (including 5% of alpha-SiC) having the average particle size 0.27 μm, and 40 g of amorphous SiC (produced by firing of polycarbosilane at 700° C. and having the average particle size of 2 μm) are added and blended in a mixer for two hours. The mixture is air-dried and ground. The ground powder is left in a draft for ten days to decompose chlorides. The fired powder is placed in a graphite mold having the internal diameter of 35 mm, and fired up to 1900° C. in a high frequency furnace at a rate of 300° C./hour under a pressure of 200 kg/sq. cm. After holding this temperature for two hours there is obtained a sintered silicon carbide shape. The shape has the specific gravity of 3.19 and the bending strength of 86 kg/sq. mm at the room temperature.

EXAMPLE 9

10 g of gadolinium oxide is dissolved in 250 ml of 2N-hydrochloric acid solution, and 40 ml of ammonia water is added to precipitate gadolinium hydroxide. Resulting gadolinium hydroxide is reacted with 220 ml of 1N-acetic acid solution for five hours and after evaporation of water there is obtained an acid adduct of gadolinium hydroxide. 1.0 g of this acid adduct is dissolved in water, and 90 g of beta-SiC (including 5% of alpha-SiC and having the average particle size of 0.27 μm) is added and blended in a mixer for two hours. The mixed powder is dried in a dryer, and dried powder is place in a metal mold of 8×36 mm and compacted with a double-acting press to form a green shape. The green shape is fired in the air up to 500° C. at a rate of 100° C./hour, then in nitrogen gas up to 1400° C. at a rate of 200° C./hour. The cooled shape is wetted with water and coated with alpha-SiC powder having the particle size of 100 μm. The coated shape is placed in a graphite crucible with surroundings of boron oxide. The covered crucible is fired with a high frequency furnace up to 1800° C. at a rate of 50° C./hour and held at this temperature for ten hours to produce a sintered silicon carbide shape. The shape has the specific gravity of 3.06 and the bending strength of 61 kg/sq. mm at the room temperature.

EXAMPLE 10

10 g of yttrium chloride is dissolved in water, and 90 g of alpha-SiC having the average particle size of 1 μm is added. The mixture is blended in a mixer for one hour, and left as it is in the air for ten days to decompose chloride. The dried powder is placed in a metal mold of 8×36 mm, and compacted with a double-acting press to form a green shape. The shape is fired in the air up to 500° C. at a rate of 100° C./hour, then up to 1400° C. at a rate of 200° C./hour in nitrogen atmosphere. The fired shape is wetted with water and coated with alpha-SiC powder having the particle size of 100 μm and placed in a graphite crucible with surroundings of graphite powder. The crucible is covered and fired with a high frequency furnace up to 2000° C. at a rate of 200° C./hour and held at this temperature for five hours to obtain a sintered silicon carbide shape. The shape ground of its surface portion has the specific gravity of 3.03 and the bending strength of 54 kg/sq. mm at the room temperature.

EXAMPLE 11

10 g of dysprosium isopropoxide is dissolved in toluene, and 2 g of carbon black and 88 g of beta-SiC (including 5% of alpha-SiC and having the average particle size of 0.27 μm) are added. The mixture is blended in a mixer for 30 minutes, and dried. The dried powder is ground and left in the air for five days to decompose dysprosium isopropoxide. The powder is placed in a metal mold of 8×36 mm, and compacted with a double-acting press to form a green shape. The shape is fired under nitrogen atmosphere up to 1400° C. at a rate of 200° C./hour. The fired shape is wetted with water and coated with alpha-SiC powder having the particle size of 100 μm. The coated shape is placed in a graphite crucible with surroundings of boron oxide. The covered crucible is fired with a high frequency furnace up to 1850° C. at a rate of 50° C./hour, and held at this temperature to form a sintered silicon carbide shape. The shape has the specific gravity of 3.08 and the bending strength of 63 kg/sq. mm at the room temperature.

EXAMPLE 12

12 g of holmium nitrate and 2 g of boric acid are dissolved in water, and 86 g of beta-SiC (including 5% of alpha-SiC and having the average particle size 0.27 μm) is added and blended in a mixer for one hour. The mixture is left in the air for complete drying, and the dried mixture is ground into powder. The powder in a metal mold of 8×36 mm and compacted with a double-acting press to form a green shape. The shape is fired in the air up to 500° C. at a rate of 100° C./hour, then in nitrogen gas up to 1400° at a rate of 200° C./hour. The fired shape is wetted and coated with beta-SiC powder having the average particle size of 100 μm. The shape is placed in a graphite crucible with surroundings of aluminum oxide. The crucible is closed with a cover, and fired with a high frequency furnace up to 1900° C. at a rate of 100° C./hour, and held at this temperature for five hours to form a sintered silicon shape. The shape has the specific gravity of 3.06 and the bending strength of 53 kg/sq. mm at the room temperature.

EXAMPLE 13

12 g of cerium acetylacetonate and 2 g of erbium acetylacetonate are dissolved in benzene, and 1.5 g of carbon black and 84.5 g of beta-SiC (including 5% of alpha-Sic and having the average particle size of 0.27 μm) are added, and blended in a mixer for 30 minutes. Evaporation of benzene from the mixture produces a solid which is ground into powder. The powder is left in the air for five days to decompose the complex. Then the powder is plced in a metal mold of 8×36 mm, and compacted with a double-acting press to form a green shape. The shape is fired in nitrogen gas up to 1400° C. at a rate of 200° C./hour. The fired shape is wetted with water and coated with alpha-SiC powder having the particle size of 100 μm. The coated shape is placed in a graphite crucible with surroundings of aluminum hydroxide and fired in the furnace up to 2000° C. at a rate of 100° C./hour and held at this temperature for three hours to form a sintered silicon carbide shape. The shape has the specific gravity of 3.10 and the bending strength of 69 kg/sq. mm at the room temperature.

EXAMPLE 14

2 g of ytterbium sulfate, 8 g of acid adduct of yttrium hydroxide synthesized in Example 1, and 1.5 g of boric acid are dissolved in water, and 1.5 g of carbon black and 87 g of alpha-SiC having the average particle size of 1 μm are added, and then blended in a mixer for three hours. Evaporation of water in the mixture produces a solid which is ground into powder. The powder is placed in a metal mold, and compacted with a double-acting press to form a green shape. The shape is fired in nitrogen gas up to 1400° C. at a rate of 100° C./hour. The fired shape is placed in a graphite crucible with surroundings of alpha-SiC having the particle size of 100 μm and outer surroundings of aluminum oxide. The crucible is closed with a cover and fired with a high frequency furnace up to 1900° C. at a rate of 100° C./hour and held at this temperature for four hours to form a sintered silicon carbide shape. The shape has the specific gravity of 3.10 and the bending strength of 65 kg/sq. mm at the room temperature.

EXAMPLE 15

12 g of cerium isopropoxide is dissolved in benzene, and 88 g of beta-Sic (including 5% of alpha-SiC and the average particle size of 0.27 μm, and blended in a mixer for 30 minutes. Evaporation of benzene produces a solid which is ground into powder. The powder is left in the air for ten days to decompose cerium isopropoxide. The powder is placed in a graphite mold having the internal diameter of 35 mm, and fired under argon atmosphere of 100 kg/sq. cm up to 2000° C. at a rate of 200° C./hour, and held at this temperature for two hours to form a sintered silicon carbide shape. The shape has the specific gravity of 3.17 and the bending strength of 76 kg/sq. mm at the room temperature.

EXAMPLE 16

10 g of acid adduct of ytterium hydroxide synthesized in Example 1 is dissolved in water, and 90 g of beta-SiC (including 5% of alpha-SiC and having the average particle size of 0.27 μm) is added and blended in a mixer for 30 minutes. Evaporation of water in the mixture produces a solid which is ground into powder. The powder is placed in a graphite mold having the internal diameter of 35 mm. The mold is set in a hot press with argon atmosphere, and fired under a pressure of 50 kg/sq. cm with a high frequency furnace up to 2000° C. at a rate of 200° C./hour, and hold at this temperature for two hours to form a sintered silicon carbide shape. The shape has the specific gravity of 3.16 and the bending strength of 74 kg/sq. mm at the room temperature.

EXAMPLE 17

12 g of lanthanum chloride is dissolved in water, and 88 g of beta-SiC (including 5% of alpha-SiC and having the average particle size of 0.27 μm) is added and blended in a mixer for one hour. The mixture is dried in the air to the solid state and ground into powder which is left in the air for ten days to decompose lanthanum chloride. The powder is placed in a metal mold of 8×36 mm, and compacted with a double-acting press to form a green shape. The shape is fired in the air up to 500° C. at a rate of 100° C./hour, and then in nitrogen gas up to 2100° C. at a rate of 200° C./hour, and held at this temperature for one hour to form a sintered silicon carbide shape. The shape has the specific gravity of 3.01 and the bending strength of 42 kg/sq. mm at the room temperature.

As described as above, sintered silicon carbide shapes formed in accordance with the present invention are dense and exhibit superior strength, acid resistance, wear resistance, creep limit and thermal shock resistance, and electric resistance varies from $10^{-1}$ ohm-cm to $10^3$ ohm-cm depending upon contents of the sintering assists. Accordingly, sintered silicon carbide shapes formed in accordance with the present invention are of higher qualities than that of prior art products, and may be formed with economical advantage because complicated or hollow configuration may be formed, further shapes in a form of thin strip may be manufactured directly from powder material. Therefore, sintered silicon carbide shapes formed by the present invention provides many applications in the fields of gas turbine blade, ball elements, gas turbine parts, various parts in equipments for transporting corrosible liquids, crucibles, lining for a ball mill, heat exchanger in a high temperature furnace, refractory material, heating elements, combustion tubes, die casting pumps, thin wall tubes, materials for a nuclear fusion furnace, a nuclear reactor, a solar furnace, and various tools and parts thereof, grinding material, heat shielding material, substrates for single crystal formation and others.

We claim:

1. A method for producing sintered silicon carbide shapes of high strength, including the steps of addition and mixing sintering assists with silicon carbide powder, and separate or simultaneous compacting and sintering of the mixture at a temperature in the range of approximately 1300° C. to 2300° C., wherein the sintering assists are selected from the group consisting of (a) a solution of at least one member selected from the group of rare earth compounds, and (b) a solution of at least one member selected from the group of rare earth compounds and another solution of at least one member selected from the group consisting of aluminum compounds and boron compounds; and when the sintering assists in group (a) are used, 0.027-11.300 atomic % of rare earth compounds are used, on a rare earth oxide basis, with the total sum of SiC and assists being 100 atomic %; and when the sintering assists in group (b) are used, 0.021-11.300 atomic % of rare earth compounds, on a rare earth oxide basis, and 0.008-12.000 atomic % of aluminum, boron and their compounds, based on their respective oxides are used, with the total sum of SiC and the assists being 100 atomic %.

2. A method for producing sintered silicon carbide shapes of high strength, including the steps of addition and mixing sintering assists with silicon carbide powder, and separate or simultaneous compacting and sintering of the mixture at a temperature in the range of approximately 1,300° C. to 2,300° C., wherein said sintering assists are selected from the group consisting of (a) a solution of at least one member selected from the group of rare earth compounds, and (b) a solution of at least one member selected from the group of rare earth compounds and another solution of at least one member selected from the group consisting of aluminum compounds and boron compounds; and when the sintering assists in group (a) are used, 0.027-11.300 atomic % of rare earth compounds are used, on a rare earth oxide basis, with the total sum of SiC and assists being 100 atomic %; and when the sintering assists in group (b) are used, 0.021-11.300 atomic % of rare earth compounds, on a rare earth oxide basis, and 0.006-12.000 atomic % of aluminum, boron and their compounds, based on their respective oxides are used, with the total sum of SiC and the assists being 100 atomic %, and wherein said sintering is performed in an atmosphere having a partial pressure of aluminum or aluminum compounds.

* * * * *